(12) United States Patent
Atassi

(10) Patent No.: US 8,974,177 B2
(45) Date of Patent: Mar. 10, 2015

(54) NACELLE WITH POROUS SURFACES

(75) Inventor: Oliver V. Atassi, Longmeadow, MA (US)

(73) Assignee: United Technologies Corporation, Hartford, CT (US)

( * ) Notice: Subject to any disclaimer, the term of this patent is extended or adjusted under 35 U.S.C. 154(b) by 1023 days.

(21) Appl. No.: 12/891,991

(22) Filed: Sep. 28, 2010

(65) Prior Publication Data

US 2012/0076635 A1  Mar. 29, 2012

(51) Int. Cl.
*F01D 25/24* (2006.01)
*F02K 3/06* (2006.01)
*B64D 33/02* (2006.01)
*F02C 7/04* (2006.01)

(52) U.S. Cl.
CPC . *F02K 3/06* (2013.01); *B64D 33/02* (2013.01); B64D 2033/0226 (2013.01); B64D 2033/0286 (2013.01); *F02C 7/04* (2013.01); F05D 2300/514 (2013.01); Y02T 50/671 (2013.01); Y10S 415/914 (2013.01)
USPC .......................... 415/201; 415/914; 244/53 B

(58) Field of Classification Search
USPC ............ 415/52.1, 58.7, 115, 182.1, 201, 914; 60/226.1; 244/53 B, 53 R, 130, 134 B, 244/207–209
See application file for complete search history.

(56) References Cited

U.S. PATENT DOCUMENTS

| | | | |
|---|---|---|---|
| 2,401,584 A | 6/1946 | Rhines | |
| 2,589,945 A * | 3/1952 | Leduc | 137/15.1 |
| 2,659,552 A | 11/1953 | Stalker | |
| 2,853,852 A | 9/1958 | Bodine, Jr. | |
| 2,925,231 A | 2/1960 | Pfaff, Jr. et al. | |
| 2,932,945 A | 4/1960 | Brandt, Jr. | |
| 3,117,751 A | 1/1964 | Rogers, et al. | |
| 3,128,973 A | 4/1964 | Dannenberg | |
| 3,149,804 A | 9/1964 | Litz, Jr. | |
| 3,314,629 A | 4/1967 | Rethorst | |
| 3,317,162 A | 5/1967 | Grant | |
| 3,371,743 A | 3/1968 | Chanaud, et al. | |
| 3,421,577 A | 1/1969 | Valyi | |
| 3,446,223 A * | 5/1969 | Hancock | 137/15.2 |
| 3,481,427 A | 12/1969 | Dobbs, et al. | |
| 3,516,895 A | 6/1970 | Hartman | |
| 3,765,623 A | 10/1973 | Donelson et al. | |
| 3,801,048 A | 4/1974 | Riccius | |

(Continued)

FOREIGN PATENT DOCUMENTS

DE  1232476  1/1967
DE  1280057  10/1968

(Continued)

OTHER PUBLICATIONS

Batchelor, G. K.. An Introduction to Fluid Dynamics. 1st ed. Cambridge: Cambridge University Press, 2000, p. 72.*

(Continued)

*Primary Examiner* — Edward Look
*Assistant Examiner* — Woody A Lee, Jr.
(74) *Attorney, Agent, or Firm* — Carlson, Gaskey & Olds, P.C.

(57) ABSTRACT

A fan nacelle for a gas turbine engine includes a leading edge region with a flow path between an intake region in a nacelle outer surface and an exhaust region in a nacelle inner surface to locally modify a flow around the leading edge region during a predefined off-design condition.

24 Claims, 4 Drawing Sheets

(56) References Cited

U.S. PATENT DOCUMENTS

| | | |
|---|---|---|
| 3,820,628 A | 6/1974 | Hanson |
| 3,821,999 A | 7/1974 | Guess et al. |
| 3,917,193 A | 11/1975 | Runnels, Jr. |
| 3,933,327 A | 1/1976 | Cook et al. |
| 3,991,849 A | 11/1976 | Green et al. |
| 4,007,891 A | 2/1977 | Sorensen et al. |
| 4,154,256 A | 5/1979 | Miller |
| 4,209,149 A | 6/1980 | Morris et al. |
| 4,294,329 A | 10/1981 | Rose et al. |
| 4,365,775 A | 12/1982 | Glancy |
| 4,379,191 A | 4/1983 | Beggs et al. |
| 4,502,651 A | 3/1985 | Junglaus et al. |
| 4,508,295 A | 4/1985 | Cattaneo et al. |
| 4,522,360 A | 6/1985 | Barnwell et al. |
| 4,738,416 A | 4/1988 | Birbragher |
| 4,749,150 A | 6/1988 | Rose et al. |
| 4,757,963 A | 7/1988 | Cole |
| 4,759,513 A | 7/1988 | Birbragher |
| 4,863,118 A | 9/1989 | Stallings, Jr. et al. |
| 4,926,963 A | 5/1990 | Snyder |
| 4,993,663 A | 2/1991 | Lahti et al. |
| 5,011,098 A | 4/1991 | McLaren et al. |
| 5,025,888 A | 6/1991 | Arcas et al. |
| 5,041,324 A | 8/1991 | Siegling et al. |
| 5,058,617 A | 10/1991 | Stockman et al. |
| 5,136,837 A * | 8/1992 | Davison ...................... 60/785 |
| 5,141,182 A | 8/1992 | Coffinberry |
| 5,156,362 A | 10/1992 | Leon |
| 5,167,387 A | 12/1992 | Hartwich |
| 5,297,765 A * | 3/1994 | Hughes et al. ................ 244/209 |
| 5,335,885 A | 8/1994 | Bohning |
| 5,366,177 A | 11/1994 | DeCoux |
| 5,415,522 A | 5/1995 | Pla et al. |
| 5,417,391 A | 5/1995 | Savitsky et al. |
| 5,423,658 A | 6/1995 | Pla et al. |
| 5,498,127 A | 3/1996 | Kraft et al. |
| 5,590,849 A | 1/1997 | Pla |
| 5,743,488 A | 4/1998 | Rolston et al. |
| 5,772,156 A * | 6/1998 | Parikh et al. .................. 244/209 |
| 5,841,079 A | 11/1998 | Parente |
| 5,884,873 A | 3/1999 | Breit |
| 5,915,403 A | 6/1999 | McConachie et al. |
| 5,934,611 A * | 8/1999 | Tindell et al. ................ 244/53 B |
| 6,216,982 B1 | 4/2001 | Pfennig et al. |
| 6,371,411 B1 | 4/2002 | Breer et al. |
| 6,457,676 B1 | 10/2002 | Breer et al. |
| 6,688,558 B2 | 2/2004 | Breer et al. |
| 6,763,651 B2 | 7/2004 | Shmilovich et al. |
| 6,910,327 B2 | 6/2005 | Sakurai et al. |
| 7,152,829 B2 * | 12/2006 | Bertolotti ...................... 244/209 |
| 7,200,999 B2 | 4/2007 | Bagnall et al. |
| 7,331,421 B2 | 2/2008 | Olsen et al. |
| 7,520,470 B2 | 4/2009 | Lucchesini et al. |
| 7,735,776 B2 | 6/2010 | Chanez et al. |
| 2005/0045774 A1 | 3/2005 | Hocking |
| 2005/0151026 A1 * | 7/2005 | Meyer ........................... 244/204 |
| 2008/0179448 A1 | 7/2008 | Layland et al. |
| 2008/0267762 A1 | 10/2008 | Jain et al. |
| 2009/0121083 A1 | 5/2009 | Jain |
| 2010/0181420 A1 * | 7/2010 | Porte et al. .................... 244/1 N |

FOREIGN PATENT DOCUMENTS

| | | |
|---|---|---|
| DE | 19720069 | 10/1997 |
| DE | 19617952 | 11/1997 |
| FR | 934381 | 5/1948 |
| FR | 2932106 A1 * | 12/2009 |
| GB | 619722 | 3/1949 |
| GB | 2187261 | 9/1987 |

OTHER PUBLICATIONS

Wong, W.F., Application of Boundary Layer Blowing to Suppress Strong Shock Induced Separation in Supersonic INlets, AIAA-P-77-147, AIAA 15th Aerospace Sciences Meeting, Jan. 1977.

Raghunathan, S., "Passive Control of Shock Boundary Layer Interaction," Progress in Aerospace Science, vol. 25, No. 3, 1988, pp. 271-296.

Jaiman, R.K, Loth, E., Dutton, J.C., "Simulations of Normal Shock-Wave/Boundary Layer Interaction Using Mesoflaps," Journal of Propulsion and Power, vol. 20, No. 2, p. 344-352, 2004.

Kim, S.D., Loth, E., Dutton, J.C., "Simulations of Mesoflap Control for Ramp-Generated Oblique Shock/Boundary Layers Interactions," AIAA Journal, vol. 40, pp. 1152-1169, 2003.

* cited by examiner

NACELLE WITH POROUS SURFACES

BACKGROUND

The present disclosure relates to gas turbine engines, and more particularly to a nacelle therefor.

In a subsonic aircraft having an externally mounted engine, for example, a turbofan engine mounted by a pylon, aerodynamic drag due to freestream airflow over the nacelle of the engine may cost approximately 4% of the total engine thrust output.

One conventional technique to reduce fan nacelle drag is to provide a relatively thick nacelle inlet so that airflow will flow around and not separate from the outer or inner surface of the fan nacelle. Since many turbofan engines provide a fan of significant diameter, a fan nacelle therefor will necessarily be of a significant diameter. This may substantially increase fan nacelle size and weight so that any reduction in the fan nacelle thickness and length in front of the fan section competes against the desire to maintain attached flow.

SUMMARY

A fan nacelle for a gas turbine engine according to an exemplary aspect of the present disclosure includes a leading edge region that defines a flow path between an intake region in a nacelle outer surface and an exhaust region in a nacelle inner nacelle surface.

A nacelle assembly for a gas turbine engine according to an exemplary aspect of the present disclosure includes a core nacelle defined about an engine centerline axis and a fan nacelle defined about the engine centerline axis and mounted at least partially around the core nacelle to define a fan bypass flow path. The fan nacelle includes a leading edge region that defines a flow path between an exhaust region in a nacelle outer surface and an intake region in a nacelle inner nacelle surface.

A method to locally modify a flow around a leading edge region of a nacelle to move a stagnation region of a captured streamline forward and weaken a shock strength according to an exemplary aspect of the present disclosure includes communicating a portion of a captured streamline through a flow path between an intake region in a nacelle outer surface and an exhaust region in a nacelle inner surface during a predefined off-design condition.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
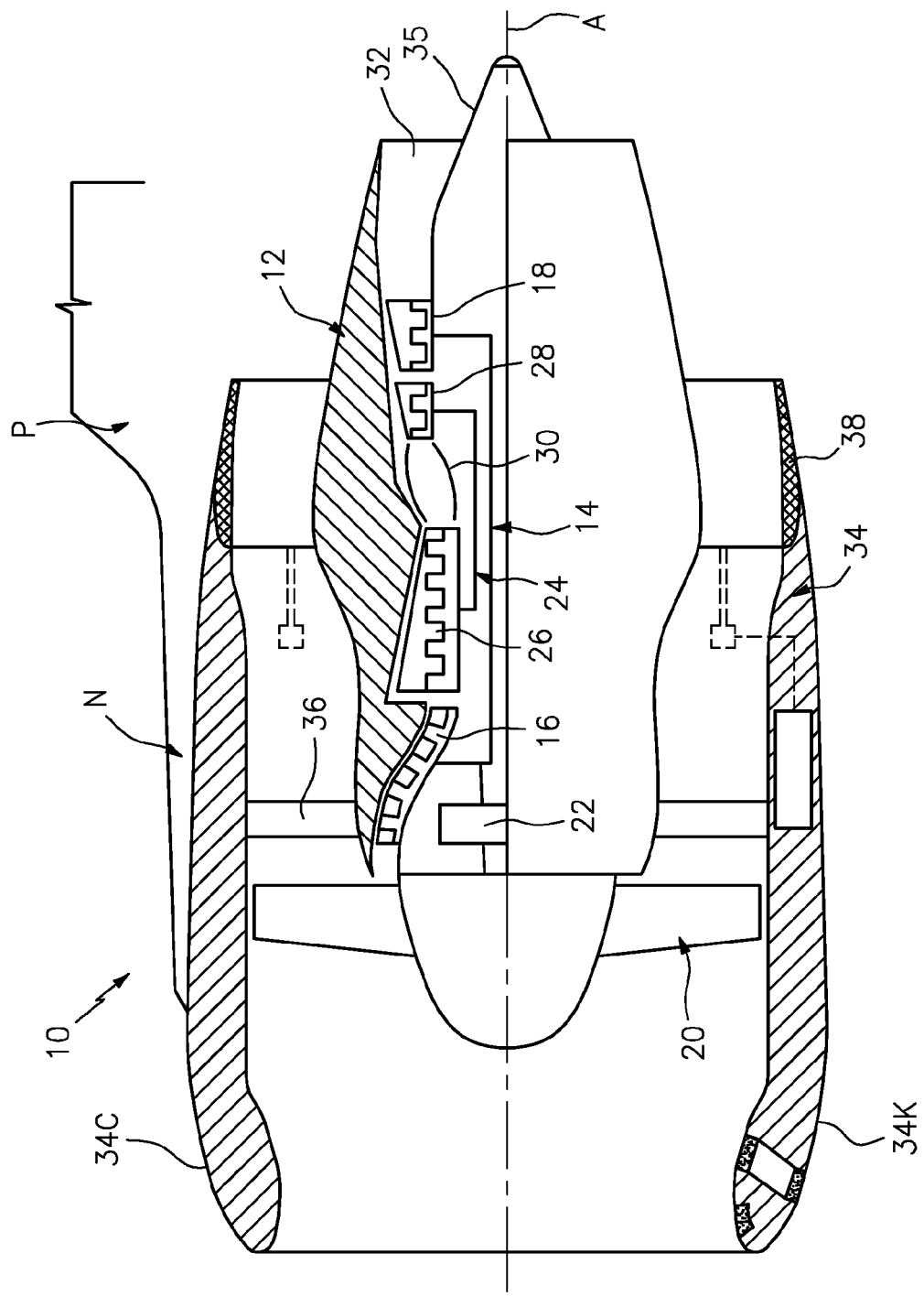
FIG. 1 is a schematic illustration of a gas turbine engine within a nacelle assembly.

FIG. 1 illustrates a partial fragmentary schematic view of a gas turbofan engine 10 suspended from an engine pylon P within an engine nacelle assembly N. While a two spool high bypass turbofan engine with a geared architecture is schematically illustrated in the disclosed non-limiting embodiment, it should be understood that the disclosure is applicable to other gas turbine engine configurations.

The turbofan engine 10 generally includes a core engine within a core nacelle 12 that houses a low spool 14 and high spool 24. The low spool 14 includes a low pressure compressor 16 and low pressure turbine 18. The low spool 14 also drives a fan section 20 through a geared architecture 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Airflow enters a fan nacelle 34, which at least partially surrounds the core nacelle 12. A portion of airflow, referred to as core airflow, communicates into the core nacelle 12. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the geared architecture 22, the fan section 20 in response to the expansion. A core engine exhaust exits the core nacelle 12 through a core nozzle 32 defined between the core nacelle 12 and a tail cone 35.

The core nacelle 12 is supported within the fan nacelle 34 by circumferentially spaced structures often referred to as Fan Exit Guide Vanes (FEGVs) 36 to define an annular bypass flow path between the core nacelle 12 and the fan nacelle 34. The engine 10 generates a high bypass flow communicated through the generally annular bypass flow path then discharged through a fan nozzle 38 which defines a nozzle exit area between the fan nacelle 34 and the core nacelle 12. The engine 10 in the disclosed embodiment is a high-bypass geared architecture aircraft engine. In one disclosed embodiment, the engine 10 bypass ratio is greater than ten (10:1) and the turbofan diameter is significantly larger than that of the low pressure compressor 16. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present application is applicable to other gas turbine engines including direct drive turbofans.

Figure 2:
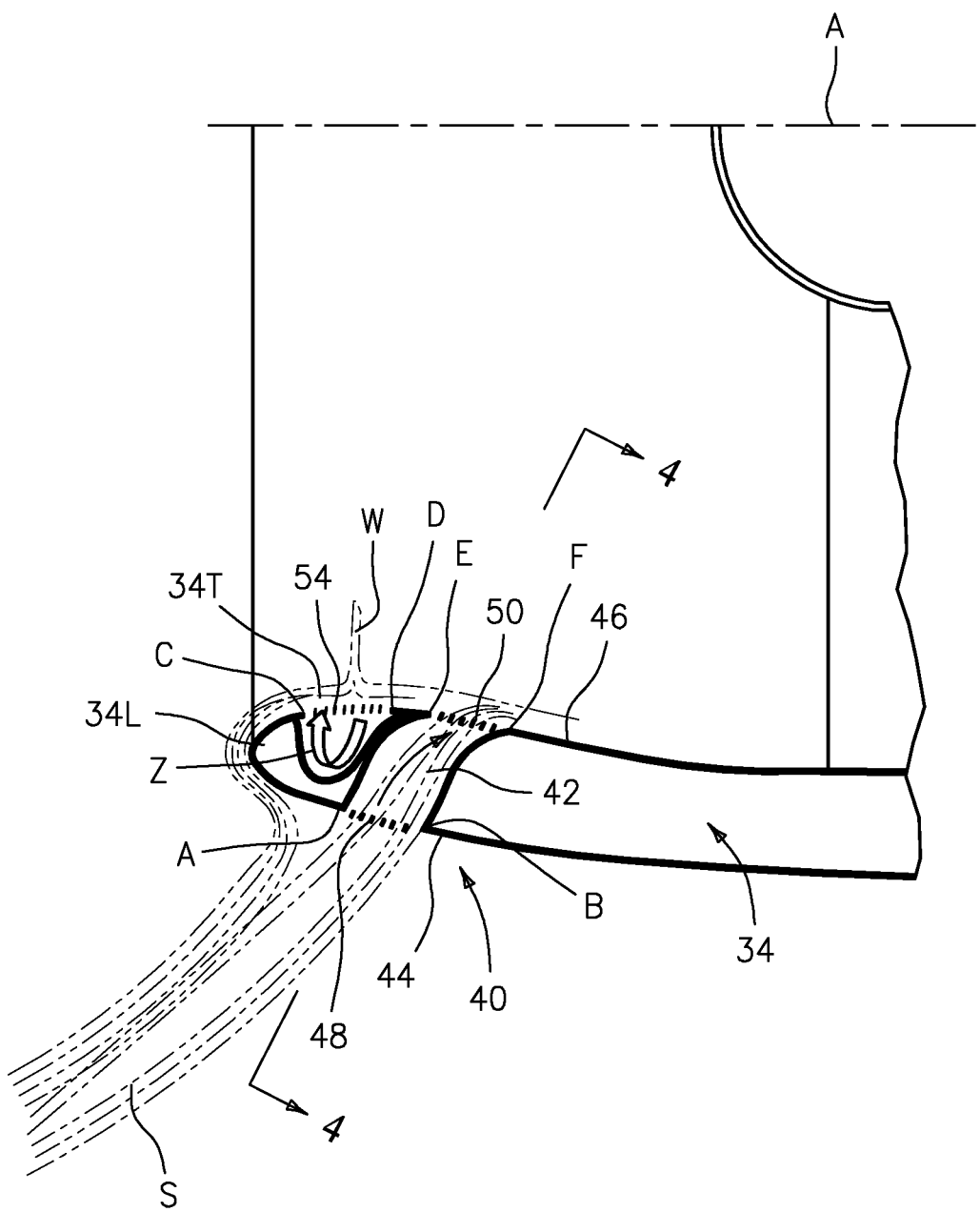
FIG. 2 is a schematic view of a captured streamline relative a fan nacelle designed according to the disclosure.

Referring to FIG. 2, the fan nacelle 34 includes a leading edge region 40 which defines a longitudinally forward-most portion of the fan nacelle 34 and a throat region 34T which is the radially narrow-most portion of the nacelle 34. As defined herein, the leading edge region 40 is defined axially forward of the throat region 34T and includes the nacelle inlet lip 34L. The forwardmost points on the nacelle inlet lip 34L are commonly called the hilite. The upper center location of the leading edge region 40 may be referred to as the crown 34C and the lower center location may be referred to as the keel 34K of the fan nacelle 34 (FIG. 1).

Figure 3:
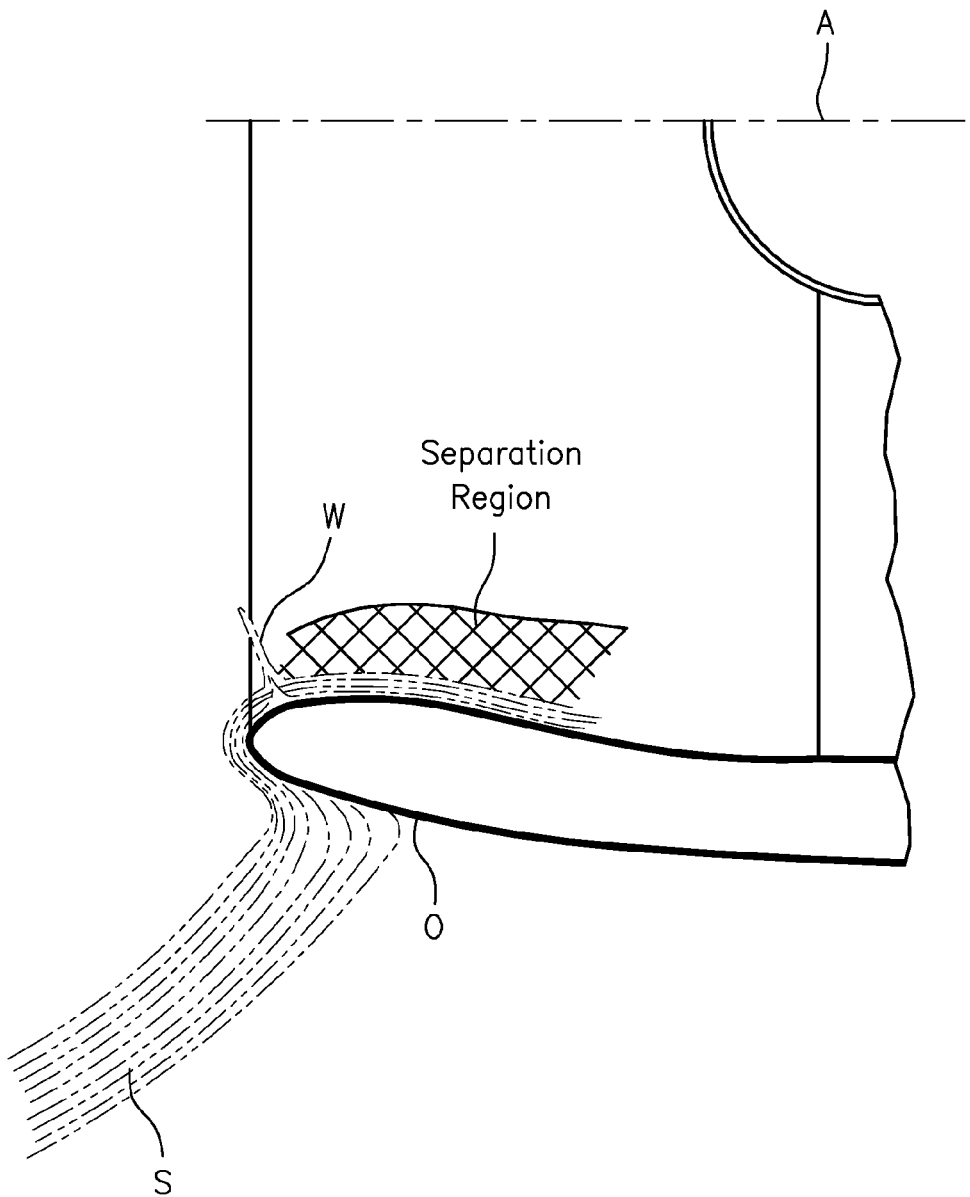
FIG. 3 is a schematic view of a captured streamline relative a RELATED ART fan nacelle.

When a nacelle operates at high angles of attack, for example, during a high-power climb, a flow field which impacts the keel of the nacelle (RELATED ART; FIG. 3) generates a captured streamline S and forms a stagnation region denoted by point O. In this situation, the flow accelerates from point O around the leading edge region such that when the local Mach number of the flow is sufficiently high, a shock W forms inside the nacelle. For a conventional nacelle with a relatively small hilite-to-throat diameter, the shock W forms upstream of the throat where the curvature of the inlet is still large and significant flow separation is induced downstream thereof by a combination of the shock strength and the shock location (RELATED ART; FIG. 3).

According to one non-limiting embodiment, a flow path 42 is defined between an outer nacelle surface 44 and an inner nacelle surface 46 to locally modify the flow around the leading edge region 40 during a predefined off-design condition such as the noted high angle of attack condition to move the stagnation region of the captured streamline S forward and thereby weaken the strength of the shock W. It should be understood that the predefined off-design conditions may be determined to facilitate, for example, a smaller hilite-to-throat ratio for a given nacelle design and thereby provide a relatively smaller, lighter and lower drag nacelle.

The flow path 42 through the leading edge region 40 is defined between an intake region 48 in the outer nacelle surface 44 and an exhaust region 50 in the inner nacelle surface 46. In one non-limiting embodiment, the intake region 48 is axially defined between points A and B in the outer nacelle surface 44 and the exhaust region 50 is axially defined between points E and F. The intake region 48 and the exhaust region 50 are defined along a circumferential distance that corresponds with an area at which the captured streamline may be generated at a predefined angle of attack. The predefined angle of attack may result in a captured streamline that may be geometrically defined within a circumferential area along the nacelle keel 34K within which the peak Mach number of the captured streamline is above about 1.2 to 1.3 Mach. In one example, this area may be defined between 160 and 200 degrees with 180 degrees defined as Bottom Dead Center (BDC) of the fan nacelle 34 (FIG. 4).

In one non-limiting embodiment, point B is located at the aftmost portion of the captured streamline S and point A is the middle of the captured streamline S at the off-design condition such as a predefined high angle of attack. Points E, F are arranged generally downstream relative to the points A, B to direct the flow through the flow path 42 in a downstream direction into the fan section 20. It should be understood that the desired off-design such as the predetermined high-angle of attack flow condition may be utilized to facilitate the location of the intake region 48 and the exhaust region 50.

Figure 4:
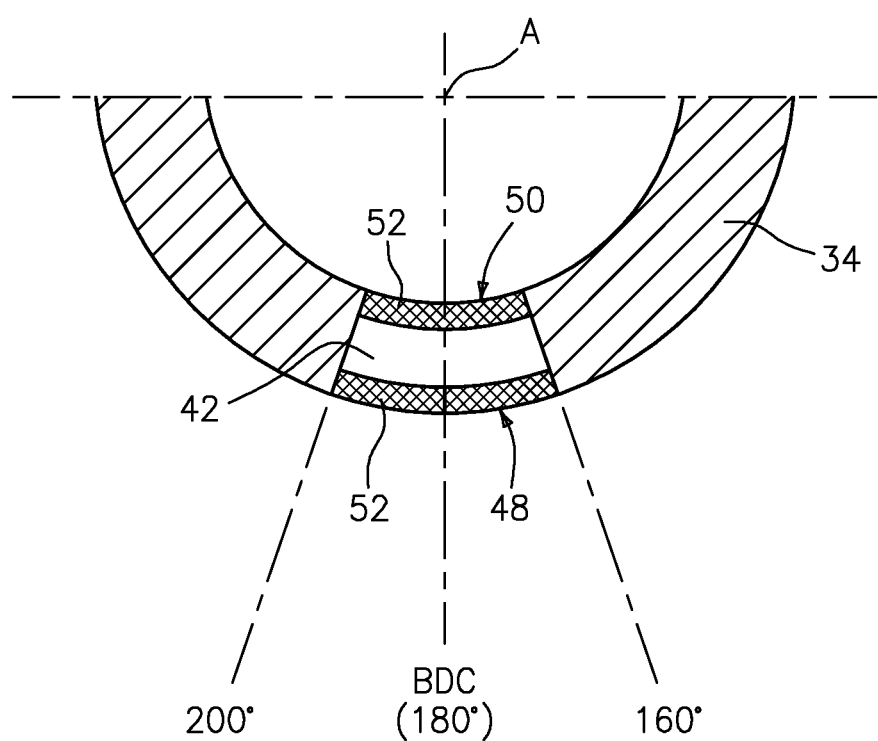
FIG. 4 is a schematic sectional view of the fan nacelle taken along line 4-4 in FIG. 2.

The intake region 48 and the exhaust region 50 may include a porous structure 52 such as a micro-pore or slot like structure (FIG. 4). The flow path 42 allows the flow which impacts the underside of the fan nacelle 34 to pass through the fan nacelle 34 to the extent that the pressure drop between the intake region 48 and the exhaust region 50 is sufficient to modify the location of the stagnation region of the flow from point O (RELATED ART: FIG. 3) to point A. That is, the stagnation region is moved forward such that flow around the nacelle lip 34L will not reach a Mach number high enough to form a strong shock W and the flow will no longer separate or the separation is minimized along the inner nacelle surface 46 to facilitate, for example, a smaller hilite-to-throat ratio for a given nacelle design and thereby provide a relatively smaller, lighter and lower drag nacelle. It should be understood that various tradeoffs may be provided through design of the flow path 42.

A tertiary region 54 located within or axially forward of the throat region 34T within the inner nacelle surface 46 may be axially defined between points C and D for a circumferential distance around the inner nacelle surface 46 forward of the exhaust region 50 for a circumferential distance defined by the area at which the shock W is generated at a predefined angle of attack. The tertiary region 54 is located to axially span the shock W such that suction occurs downstream of the shock W and blowing occurs upstream of the shock W though the tertiary region 54 as represented by the arrow Z so as to weaken the strength of the shock W. The tertiary region 54 may include a porous structure such as a micro-pore or slot like structure. It should be understood that the tertiary region 54 may be optionally provided.

The forward position of the captured streamline stagnation region improves the off-design performance of the fan nacelle 34 and the strength of the shock W is reduced by the tertiary region 54. The porous structure 52 within the intake region 48, exhaust region 50 and tertiary region 54 permit through flow at the designed high angle of attack off-design conditions with minimal impact to pressure recovery at on-design conditions such as level flight cruise conditions.

The percent open area, for example 10%, of the porous structure 52 may be optimized to minimize losses at conditions where the flow field is not at the high angles of attack such as the on-design cruise condition yet generates enough flow at the off-design conditions to facilitate a smaller hilite-to-throat ratio for a given nacelle design and thereby provide a relatively smaller, lighter and lower drag nacelle.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A fan nacelle for a gas turbine engine comprising:
an annular leading edge region that extends around an axis and defines a flow path between an intake region at a nacelle radially outermost surface and an exhaust region at a nacelle radially innermost surface, wherein said exhaust region includes a porous structure; and
a tertiary region within the innermost surface forward of the exhaust region, the tertiary region including a blind opening, the blind opening comprising a concave region formed in the nacelle radially innermost surface, straddling a shock line.

2. The fan nacelle as recited in claim 1, wherein said intake region includes another porous structure.

3. The nacelle assembly as recited in claim 2, wherein said porous structures include micro-pores.

4. The nacelle assembly as recited in claim 2, wherein said porous structures include slot-like structures.

5. The fan nacelle as recited in claim 2, wherein open areas of said porous structures are optimized to minimize losses at conditions other than a predefined off-design condition.

6. The fan nacelle as recited in claim 5, wherein said conditions other than said predefined off-design condition includes a cruise condition.

7. The fan nacelle as recited in claim 2, including an open flow path extending radially between the porous structures.

8. The fan nacelle as recited in claim 1, wherein said intake region and said exhaust region extend for a circumferential distance around a nacelle keel of said leading edge region axially forward of a throat region.

9. The fan nacelle as recited in claim 1, wherein said blind opening includes another porous structure.

10. The fan nacelle as recited in claim 1, wherein an axially forward-most point of said intake region is axially forward of an axially forward-most point of said exhaust region.

11. The fan nacelle as recited in claim 10, wherein an axially aft-most point of said intake region is axially forward of an axially aft-most point of said exhaust region.

12. The fan nacelle as recited in claim 1, wherein said intake region is located at a position on a nacelle keel within a captured streamline at a predefined angle of attack such that a portion of said captured stream line enters said intake region.

13. A nacelle assembly for a gas turbine engine comprising:
 a core nacelle defined about an engine centerline axis;
 a fan nacelle defined about said engine centerline axis and mounted at least partially around said core nacelle to define a fan bypass flow path, said fan nacelle defines a leading edge region that defines a flow path between an intake region at a nacelle radially outermost surface and an exhaust region at a nacelle radially innermost surface; and
 a tertiary region within the innermost surface forward of the exhaust region, the tertiary region including a blind opening, the blind opening comprising a concave region formed in the nacelle radially innermost surface, straddling a shock line.

14. The nacelle assembly as recited in claim 13, wherein said intake region and said exhaust region extend for a circumferential distance around a nacelle keel of said leading edge region axially forward of a throat region.

15. The nacelle assembly as recited in claim 13, wherein said intake region and said exhaust region each includes a porous structure.

16. The nacelle assembly as recited in claim 15, including an open flow path extending radially between the porous structures.

17. The nacelle assembly as recited in claim 13, wherein said porous structure includes micro-pores.

18. The nacelle assembly as recited in claim 13, wherein said tertiary region includes a porous structure.

19. The nacelle assembly as recited in claim 18, wherein said porous structure includes micro-pores.

20. A method to locally modify a flow around a leading edge region of a nacelle to move a captured streamline stagnation region forward and weaken a shock strength comprising:
 communicating a portion of a captured streamline through a flow path defined between an intake region in a nacelle outermost surface and an exhaust region in a nacelle innermost surface during a predefined off-design condition, wherein said exhaust region includes a porous structure; and
 locating a tertiary region within the innermost surface forward of the exhaust region to straddle a shock line.

21. A method as recited in claim 20, further comprising:
 optimizing an open area of a porous structure within the intake region and the exhaust region to minimize losses at conditions other than the predefined off-design condition.

22. A method as recited in claim 20, further comprising:
 optimizing the flow path to minimize losses at conditions other than the predefined off-design condition.

23. A method as recited in claim 20, further comprising:
 defining the predefined off-design condition as a high-angle of attack condition.

24. A method as recited in claim 20, said tertiary region including a blind opening, and said blind opening is configured to axially span a shock such that suction occurs downstream of the shock and blowing occurs upstream of the shock.

* * * * *